Dec. 30, 1952  G. G. SPRATT  2,623,712
AIRPLANE WITH PIVOTALLY MOUNTED SUSTAINING WING
Filed Sept. 21, 1946  3 Sheets-Sheet 1
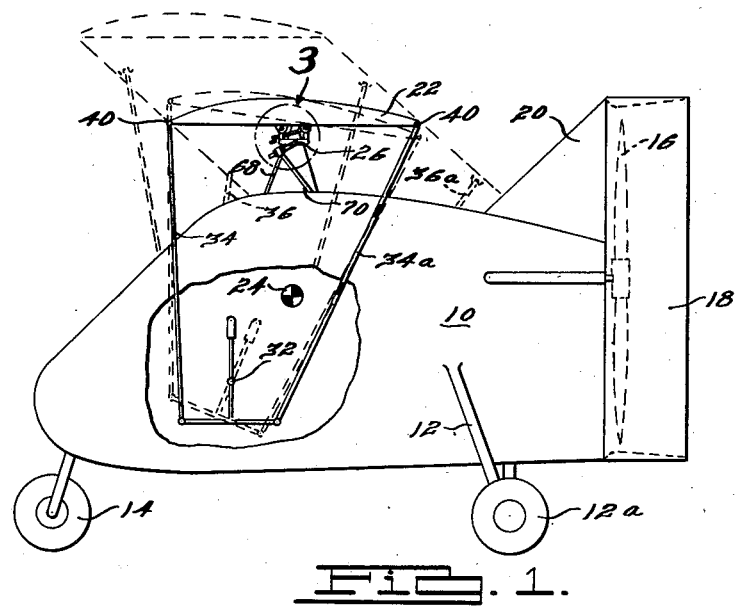
INVENTOR.
George G. Spratt
BY Harness, Dickey & Pierce
ATTORNEYS

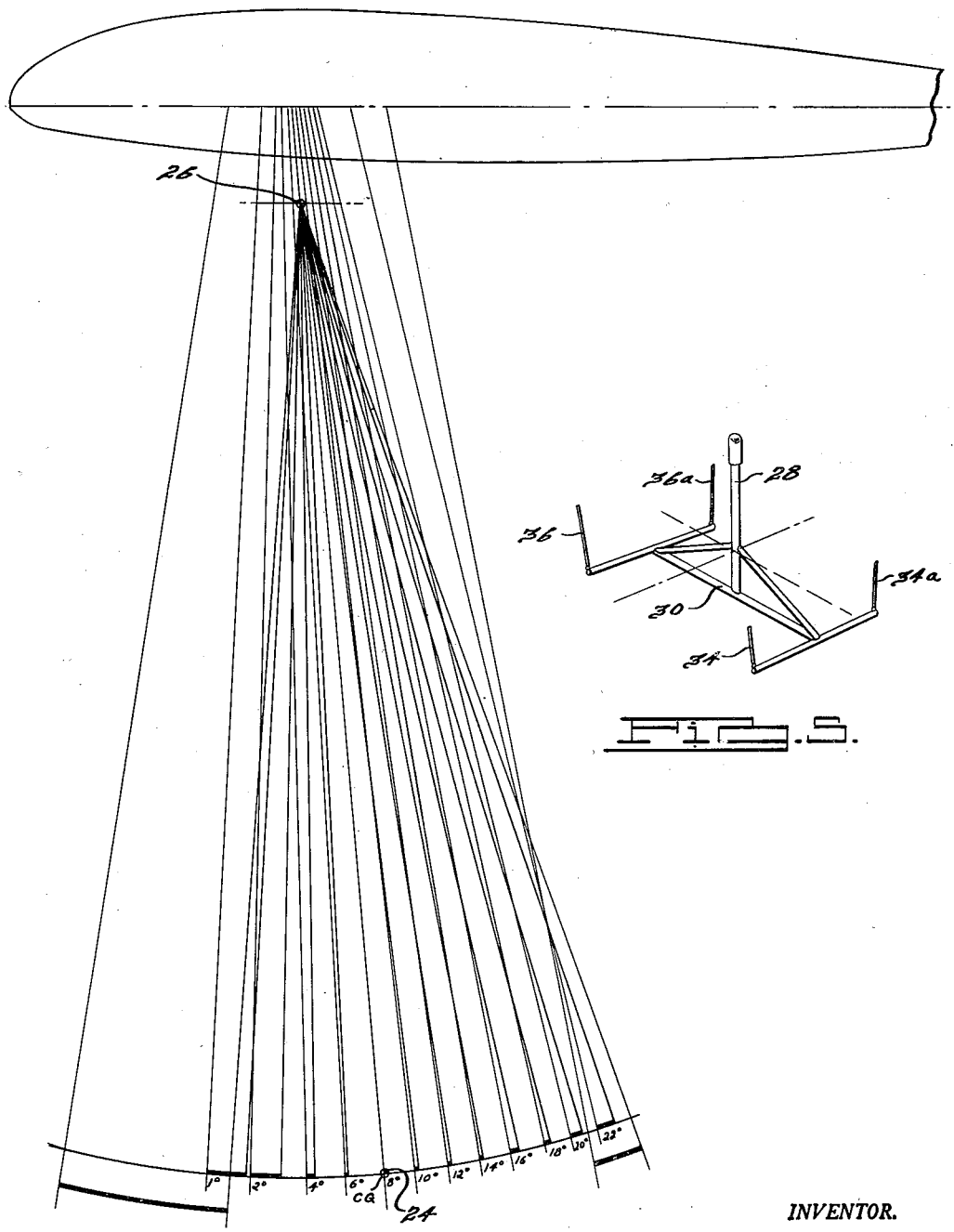

Dec. 30, 1952        G. G. SPRATT        2,623,712
AIRPLANE WITH PIVOTALLY MOUNTED SUSTAINING WING
Filed Sept. 21, 1946                              3 Sheets-Sheet 3
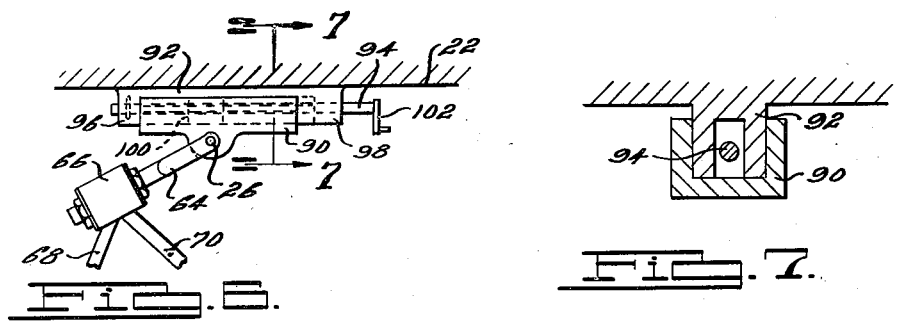
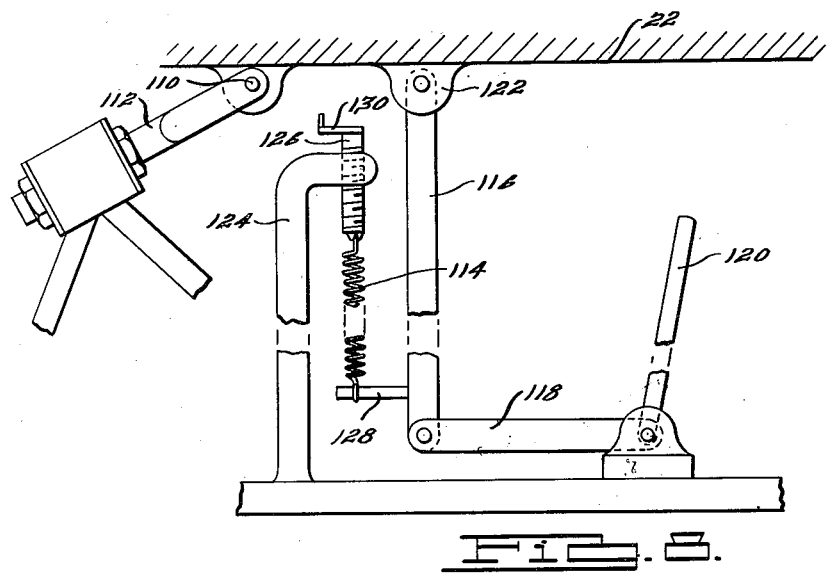
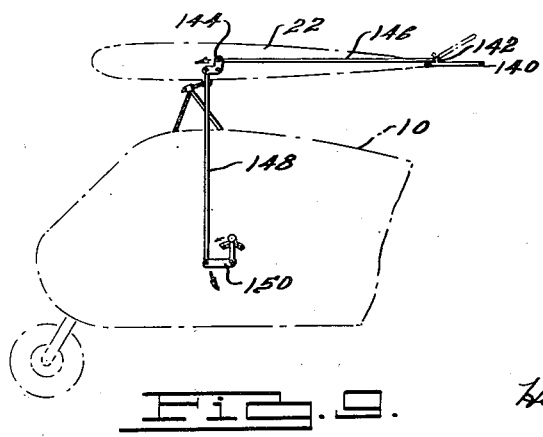
INVENTOR.
George G. Spratt
BY Harness, Dickey & Pierce
ATTORNEYS Patented Dec. 30, 1952

2,623,712

UNITED STATES PATENT OFFICE 2,623,712

AIRPLANE WITH PIVOTALLY MOUNTED SUSTAINING WING

George G. Spratt, Chester, Conn.

Application September 21, 1946, Serial No. 698,503

8 Claims. (Cl. 244—48)

The present invention relates to airplanes and, more particularly, relates to a constant speed airplane in which ascent or descent is controlled by increasing or decreasing the propeller thrust.

As is well known to those skilled in the art, the conventional fixed wing airplane is longitudinally controlled by horizontal airfoils some distance behind the center of gravity. The control forces produced by these airfoils are dependent upon the air flow past them at an angle which is less than the stalling angle. Above the stalling angle, the lift of the airfoils drop off rapidly in all airfoils and if the center of gravity of the entire airplane were under the center of pressure of the wing and the main airfoil stalled, that is to say, if the wing airfoil stalled, the airplane would start to fall in approximately level manner. As a result there would be oscillating and buffeting, but the air flow would remain at such an angle to the control surfaces than an unstalled flow over those surfaces could never develop and the control of the airplane would never be regained.

As a solution to this problem, in a fixed wing airplane, the center of pressure generally lies ahead of the center of gravity of the airplane and for the purpose of equilibrium there is normally a download on the tail surfaces of the so-called control surfaces. Thus, in the case of a stall, the nose of the airplane falls and the plane accelerates, pointing the nose down until the direction and velocity of the air past the control surfaces is sufficient to allow the airplane to level off. Where there is sufficient time, because the airplane is at considerable altitude, recovery may be possible, however, if the airplane does not have sufficient altitude there will not be sufficient time to recover, and an accident results.

With all airfoils, the lift varies with the square of the velocity and the control surfaces on an airplane are no exception to this rule. Therefore, if a conventional fixed wing airplane has sufficient control surface to satisfactorily control the airplane during the take off or landing, at which time the speed of the airplane is considerably reduced from its maximum speed, the control surfaces will be many times too large to be used satisfactorily at high speed and, conversely, if the control surfaces were satisfactory at the top speed of the airplane, the airplane would be entirely uncontrollable at take off or landing. For this reason, in the design of the conventional fixed wing airplane, it is very difficult to make a satisfactory compromise between the control surface area required for take off or landing and the control surface area required for maximum speed.

Therefore, the primary object of the present invention is to provide a constant speed airplane which may be caused to ascend or descend by increasing or decreasing the propeller thrust.

Another object of the present invention is to provide a constant speed airplane which has a wing freely responsive to aerodynamic forces about a spanwise axis and a lateral axis perpendicular to the spanwise axis and which has none of the control surfaces of a conventional fixed wing airplane and further which is directionally controlled by means of the wing when desired.

Another object of the present invention is to provide an airplane which may be set to fly at a predetermined speed and will continue to fly at that speed regardless of propeller thrust.

Another object of the present invention is to provide an airplane which basically uses a throttle for longitudinal control and a separate means for changing or setting the speed.

Still further, the present invention contemplates an airplane which can be safely operated at a minimum speed.

Still further, the present invention contemplates an airplane having no means for physically pointing the nose of the airplane up or down in which the fuselage inherently remains substantially level at all times.

Further objects and advantages of my invention will be apparent from the description which follows when considered in connection with the accompanying drawings in which like numerals indicate like parts wherever shown and wherein:

Figure 1 is a side elevational view of an airplane embodying the improvements of the present invention;

Fig. 2 is a front elevational view of the airplane of Figure 1;

Fig. 3 is a greatly enlarged side elevational view of the wing hinge structure within the circle 3 of Figure 1 and illustrates means for shifting the effective hinge point of the wing to control the speed of the airplane without restricting the freedom of movement of the wing;

Figure 4 is a diagram showing a pattern of resultant force lines corresponding to operation throughout a range of angles of attack of a wing having a particular airfoil section known as an N. A. C. A. 23112 which may be used for the wing of the airplane of the present invention. This figure illustrates the rearward shift of force lines with increases in angle of attack as indicated by the indexed resultant force lines. Other types of airfoils produce different patterns of resultant force lines and only those wings having an airfoil section which provide an area in the force line pattern wherein there is a progressive rearward shift of the resultant force line with each progressive change in increase of angle of attack may be used in the practice of this invention.

Figure 4 further illustrates the proper location of the pivotal axis provided by the support connection with respect to the resultant force lines.

The force line pattern of an airfoil section may be determined from N. A. C. A. airfoil data or experimentally in a wind tunnel.

Fig. 5 is a perspective view of a control means for directional control which may be used in the airplane of the present invention;

Fig. 6 is a modification of the present invention and illustrates another means for providing for the shifting of the position of the wing hinge point to accomplish speed control of the airplane;

Fig. 7 is a section taken on line 7—7 of Figure 6;

Fig. 8 is another modified form of the present invention and illustrates means for controlling the speed of the airplane by applying an equal torque to the wing;

Fig. 9 is still another modification of the present invention and illustrates a fin tab applied to the trailing edge of the wing for controlling the speed of the airplane.

The present invention consists of an airplane having a wing, a fuselage and a pivotable support or hinge connection between the wing and the fuselage, the wing having certain characteristics set forth above in the description of Figure 4. The support or hinge connection providing free movement of the wing about an axis parallel to the spanwise axis of the wing and movement about an axis lying in a vertical plane containing the longitudinal axis of the fuselage. Preferably the support connection is constructed to permit the pilot to shift, in a chordwise direction, the pivotal axis that parallels the spanwise axis of the wing for purposes of speed control.

Directional and lateral control is provided by a control connected to the wing to rock it about the pivotal axis lying in the vertical plane containing the longitudinal axis of the fuselage. The location of the pivotal axis that is parallel to the spanwise axis of the wing is set forth above and is shown in Figure 4. Such an airplane provided with a conventional propulsive means greatly simplifies the construction and operation of aircraft.

Referring to the drawings, the airplane is shown as having a fuselage 10. A tricycle type landing gear which consists of a main gear 12 having wheels 12a and 12b and the nose wheel 14 to support the airplane when it is on the ground is shown fixed to the fuselage 10. It is here pointed out that while a tricycle type landing gear is illustrated in this case, such landing gear is only illustrated for the purpose of showing means to support the airplane when the same is on the ground and it is not intended that the invention be limited by the type of landing gear attached to the fuselage.

A propeller 16 is mounted within the cowl 18 at the end of the fuselage 10 and driven by a motor (not shown) which is controlled by the usual throttle (not shown). A small vertical fin or stabilizer 20 is secured to the cowl 18 and the fuselage 10 at the aft end of the fuselage and serves to insure that the center of side pressure of the fuselage will lie back of the center of gravity of the airplane, as will hereinafter become more clear.

To initially lift the airplane into the air and support the same when in flight, a wing 22 is mounted to the structure of the airplane. The center of gravity 24 of the airplane is located directly under the center of the pressure of the wing 22 and as will hereinafter become more clear, the wing 22 is permitted to pivot freely about a spanwise axis extending through a point 26 and laterally about an axis perpendicular to and intersecting the spanwise axis centrally of the point 26, which is central with respect to the longitudinal axis. The wing 22 is uncontrolled as it moves about the spanwise axis, but may be controlled laterally to provide for directional control when that is desired, otherwise the wing 22 is also free to move about the lateral axis in response to aerodynamic forces.

In order to directionally control the airplane by means of the wing 22, there is provided a control stick 28 located within easy reach of the pilot's hand and rigidly attached to a braced H-frame generally indicated at 30 and secured to the structure of the airplane in any suitable manner for universal movement about a point 32. Thus, to directionally control the airplane, the stick 28 may be moved sideways, causing wires 34 and 34a to pull the right wing downwardly as illustrated in Fig. 2, as the wires 36 and 36a allow the left wing to move upwardly. As will hereinafter become more clear the wing 22 moves laterally about an axis which may be so inclined with respect to the fuselage 10, that as one side of the wing 22 moves upwardly, that side will also move forwardly to aid in directionally controlling the airplane.

In normal flight, however, the pilot's hand is removed from the stick and the airplane is permitted to fly freely, the wing 22 moving about the predetermined axes in accordance to the air flow passing over it and to compensate for variations of propeller thrust occasioned by throttle control. The wing structure of the airplane of the present invention is made extremely light in relation to the weight of the entire airplane and inasmuch as recovery due to a gust or increase or decrease of propeller thrust is materially dependent upon inertia, recovery of the wing alone is infinitely faster than that of the entire airplane.

Insofar as the fuselage 10 is concerned, the only requirement of the fuselage, other than being structurely sound, is that it be directionally stable; that is to say, that the center of gravity of the airplane be ahead of the center of side pressure of the fuselage when the airplane is in flight. For this purpose, there is provided a small stabilizer 20, previously mentioned. This small stabilizer insures that the center of side pressure of the fuselage will lie behind the center of gravity of the airplane, thereby making the fuselage directionally stable.

Returning now to the hinge structure of the wing, and bearing in mind the broader aspects of the present invention, the hinge construction may be of any type so long as it provides for tilting movement of the wing 22 relating to the fuselage about an axis which is spanwise of the wing and lateral movement of the wing about an axis which is perpendicular to the spanwise axis in response to aerodynamic forces, and preferably is such as to permit the point 26 to be shifted chord-wise relative to the wing 22 to permit speed control of the airplane without restricting the freedom of movement of the wing. In the present case, there is shown for the purpose of illustration, a support for the wing by means of which all of the above described movements may be realized, and this support includes a hinge structure in the nature of a parallelogram. Thus, there is shown a hinge bracket 44 and a hinge bracket 46 anchored to the wing 22 and to which the downwardly extending members 48 and 50, respectively, are pinned at 52 and 54. A link 56 extends between the members 48 and 50 and is pinned at 58 to the link 48 and pinned at 60 to the link 50. It is pointed out that the link 56 may be parallel to the lower surface of the wing, if that surface has no lower camber, however, if the wing should have lower camber then the link 56 will be mounted parallel to the chord of the wing, in which case the lengths of the links 48 and 50 may be proportioned to effect movement of the link 56 parallel to the chord instead of the bottom surface of the wing. The point 26, described in the foregoing, is at the midpoint of the link 56 and there the link 56 is pinned to a yoke 64 rotatively mounted in a bearing 66. This bearing 66 is mounted at the top of a supporting structure of which members 68 and 70, shown broken, are a part. The members 68 and 70 may be integrally secured to the fuselage 10 in any suitable manner to provide sufficient structural strength and rigidity to transmit loads to the fuselage for dissipation therein.

As may be seen best in Figure 1, the yoke 64 is mounted for rotation about an axis which is inclined with respect to the fuselage and as the wing 22 is moved laterally about this inclined axis the upwardly moving side of the wing also moves slightly forwardly as indicated by the dotted lines in Figure 1. The slope of this axis is preferable, however not required, as it tends to improve the directional control of the airplane.

In the hinge illustrated, means are provided for shifting the point 26 chord-wise relative to the wing. The means for accomplishing this comprises a rotatable screw 74 journaled for rotation within bearings 76 and 78; bearing 76 being secured to the member 48, and bearing 78 being anchored to the hinge bracket 46. The screw 74 is threaded through bearing 76, which bearing serves as a lead nut, and the screw 74 is retained within the bearing 78 by means of lock nuts 80 and 82. Thus, it will be obvious that as the screw 74 is rotated by means of a crank 84, anchored to the lower end of the screw 74, the bearing 76 will move along the screw 74 rotating the member 48 and the member 50 about their respective pins to thereby shift the point 26 chord-wise relative to the wing 22.

In order to understand the operation of speed control of the airplane of the present invention and, bearing in mind the hinge construction described in the foregoing, it may be assumed for the purpose of this disclosure, that the point 26 is set on the eight degree lift vector as illustrated in Fig. 4. Then, with the wing 22 freely movable as described, the airplane of the present invention will fly at 84 miles per hour. When the hinge is set in this manner, additional propeller thrust results in the airplane climbing, and less propeller thrust than required to fly the airplane at 84 miles per hour results in descent.

With the wing 22 hinged at the point 26 and set on the eight degree lift vector for level flight as described in the foregoing, the action of the airplane of this invention may now be described. If, for example, the engine throttle is opened to increase the thrust of the propeller 16 sufficiently, let us say tending to momentarily increase the speed of the airplane to 97 miles per hour in level flight, the lift vector will move to the corresponding angle of attack for that speed, which is six degrees as may be seen in Figure 4. This places the lift vector ahead of the point 26 and results in a restoring moment or torque about the point 26 tending to return the wing to the eight degree angle of attack. As a result, the speed of the airplane remains at 84 miles per hour and the energy of the propeller 16 is absorbed by ascent of the airplane.

To determine the value of the restoring moment or torque which thus results, the distance which the six degree vector lies ahead of the point 26 may be measured in a direction perpendicular to the eight degree vector and through the point 26 on a diagram similar to Figure 4, but preferably on substantially larger scale for accuracy. The product which results from multiplying that distance by the weight of the airplane is the restoring moment or torque tending to increase the angle of the wing relative to the fuselage thereby allowing the airplane to ascend but not go faster. If, on the other hand, the throttle be closed so the propeller 16 does not deliver sufficient thrust to fly the airplane at 84 miles per hour, the lift vector moves rearwardly, producing a restoring moment or torque depending upon the distance of that lift vector from the point 26, which would be computed in the same manner to determine the restoring moment tending to change the attitude of the wing relative to the fuselage to permit the airplane to descend at a rate just sufficient to supply enough energy to keep the airplane flying at 84 miles per hour.

In the modification illustrated in Figure 6, another method is shown for shifting the position of the point 26 chord-wise relative to the wing 22. In this form, the yoke 64 is shown pivoted at 26 to a slidable member 90 which is mounted by means of a bracket 92 on the wing 22 for slidable movement. A feed screw 94 is journaled for rotation within bearings 96 and 98 on the bracket 92, and the slide 90 has a lead nut adapted to be threaded onto the feed screw 94. As a feed screw 94 is rotated by means of a crank 102, anchored to one end of the feed screw, the lead nut 100 effects shifting of the slide 90 chord-wise relative to the wing 22 and thereby shifts the point 26 chord-wise relative to the wing 22. This permits the pivot point to be shifted so that the same may be placed on the desired lift vector and the airplane of the present invention flown at a speed corresponding to that lift vector.

In the modification illustrated in Figure 8, the wing 22 is shown as hinged as at 110 to a member 112 which may be a yoke similar to yoke 64, and which may extend upwardly from the fuselage 10. The pivot point 110 is not shifted, but remains in the same position, and speed control with this form of the invention is accomplished by applying a torque to the wing about the pivot point 110 through the agency of a spring 114. The spring 114 may be a constant rate spring, that is to say; it will deflect uniformly with increased load. In Fig. 8, it may be observed that additional linkage 116 and 118 is attached to a control stick 120 and secured to the wing 22 by a hinge 122. This linkage provides the pilot with means to manually apply a torque about the hinge point 110 should he desire to quickly change the trim of the aircraft. A bracket 124 may be anchored to the floor of the fuselage 10 in erect position and provides for rotatably supporting a feed screw 126. The spring 114 has one end secured to the feed screw 126 and the other end secured to a fastening member 128 attached to the link 116. When the feed screw 126 is rotated by means of a crank 130, fixed to the feed screw, the tension of the spring 114 may be varied for changing the amount of torque effective about the pivot 110 and the wing 22 and thereby effecting speed control of the airplane.

In Figure 9, still another means of effecting speed control of the airplane is shown. There, the wing 22 is shown provided at its trailing edge with a trim tab 140 which may be controlled by means of linkage. For this purpose, a fitting 142 fixed to the tab 140 is connected to a bell crank 144 by means of a rod 146. Another rod 148 connects the bell crank 144 to an adjustable control lever 150, located interiorly of the fuselage. The control lever 150 may be shifted while the airplane is in flight to move the trim tab 140, thereby controlling the speed of the airplane.

It will be clear from the foregoing description that the airplane shown in the drawings and described above has been illustrated and described in rather specific detail. Obviously, many modifications, changes and departures from the above described construction may be made without departing from the generic spirit and scope of the invention as set forth in the sub-joined claims.

What is claimed is:

1. An aircraft comprising a wing, a fuselage, and a pivotable support connection between said wing and said fuselage, said connection providing free movement of said wing about a pivotal axis parallel to the span-wise axis of said wing, said wing having an airfoil section characterized by a pattern of resultant force lines corresponding to operation of said wing throughout the range of lift-producing angles of attack, a portion of said pattern of resultant force lines exhibiting with increased angles of attack a rearward displacement along a line parallel with the chord of said airfoil section, said pivotal axis being located between the most rearward and most forward lines of resultant force of said portion of said pattern.

2. An aircraft structure as set forth in claim 1 and including pilot actuated means connected to said wing and said pivotal connection for varying the chordwise location of said pivotal axis with respect to said wing.

3. An aircraft structure as set forth in claim 1 and including pilot actuated means connected to said wing for applying a torque to said wing about said pivotal axis.

4. An aircraft structure as set forth in claim 1, and wherein said pivotable support connection comprises a hinge providing movement of said wing about a second pivotal axis lying in a vertical plane containing the longitudinal axis of said fuselage.

5. An aircraft comprising in combination a wing having an airfoil section which when flown at several progressively increasing lift-producing angles of attack defines in a vertical plane containing an airfoil section of said wing an area wherein the line of resultant force generated by said wing shifts progressively rearwardly with each progressive change in increase of angle of attack, a fuselage, and a pivotal hinge connection between said wing and said fuselage, said pivotal connection providing a pivotal axis parallel to the spanwise axis of said wing and providing free movement of said wing about said pivotal axis, the pivotal axis of said connection being located in said area.

6. An aircraft structure as set forth in claim 5 and including pilot actuated means connected to said wing and said pivotal connection for varying the chordwise location of said pivotal axis with respect to said wing.

7. An aircraft structure as set forth in claim 5 and including pilot actuated means connected to said wing for applying a torque to said wing about said pivotal axis.

8. An aircraft structure as set forth in claim 5, and wherein said pivotal connection comprises a hinge providing movement of said wing about a second pivotal axis lying in a vertical plane containing the longitudinal axis of said fuselage.

GEORGE G. SPRATT.

REFERENCES CITED

The following references are of record in the file of this patent:

UNITED STATES PATENTS

| Number | Name | Date |
|---|---|---|
| 1,849,652 | Ballou | Mar. 15, 1932 |
| 1,906,005 | Hall | Apr. 25, 1933 |
| 1,915,809 | Welsher | June 27, 1933 |
| 1,931,809 | Ballow et al. | Oct. 24, 1933 |
| 2,104,006 | Ballow | Jan. 4, 1938 |
| 2,128,060 | Spratt | Aug. 23, 1938 |
| 2,160,089 | Schairer | May 30, 1939 |
| 2,428,194 | Bockrath | Sept. 30, 1947 |

FOREIGN PATENTS

| Number | Country | Date |
|---|---|---|
| 10,257 | France (Addition to 396,821) | June 9, 1909 |
| 414,120 | Germany | May 27, 1925 |